United States Patent [19]
Esclamadon et al.

[11] 3,718,700
[45] Feb. 27, 1973

[54] NEW AND USEFUL DITHIOLS, THEIR PREPARATION AND COMPOSITIONS MADE FROM THEM

[75] Inventors: Christian Esclamadon, 64 Billere; Yves Labat, 64 Pau; Jean-Baptiste Signouret, 64 Billere, all of France

[73] Assignee: Societe Anonyme dite: Societe Nationale des Petroles D'Aquitaine, Tour Aquitaine, France

[22] Filed: Jan. 28, 1970

[21] Appl. No.: 6,553

[30] Foreign Application Priority Data

Jan. 31, 1969 France..................................6902064

[52] U.S. Cl. ............260/609 R, 106/19, 106/287 SC, 260/609 D
[51] Int. Cl..............................................C07c 149/14
[58] Field of Search.......................260/609 A, 609 D

[56] References Cited

UNITED STATES PATENTS

| | | | |
|---|---|---|---|
| 3,503,930 | 3/1970 | Morris et al. .................260/609 A X |
| 3,403,187 | 9/1968 | Oswald et al......................260/609 B |
| 3,522,314 | 7/1970 | Warner.............................260/609 D |
| 2,919,262 | 12/1959 | Nummy.........................260/609 A X |
| 2,397,689 | 4/1946 | Pavlic et al. ......................260/609 A |

OTHER PUBLICATIONS

Walker, "Formaldehyde" Third edition, pp. 364–366 (1962)

*Primary Examiner*—Lewis Gotts
*Assistant Examiner*—D. R. Phillips
*Attorney*—Milton J. Wayne

[57] ABSTRACT

New dithiol compounds have formal and thioether groups and the general formula

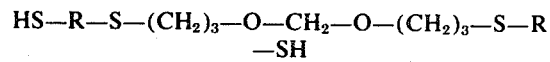

$$HS-R-S-(CH_2)_3-O-CH_2-O-(CH_2)_3-S-R-SH$$

in which R is a divalent radical of from one to 10 carbon atoms; it can be a substituted or unsubstituted, linear or branched aliphatic group, a cycloalkyl group or an aromatic group, and it may comprise one or more thioether groups. These compounds are prepared by causing a dithiol of the formula HS—R—SH to react with a diallyl formal.

These new dithiol compounds are used for the plasticization of sulphur and for the production, as new industrial products, of plastic sulphur compositions.

3 Claims, No Drawings

NEW AND USEFUL DITHIOLS, THEIR PREPARATION AND COMPOSITIONS MADE FROM THEM

SUMMARY OF THE INVENTION

The present invention relates to novel dithiol compounds, to compositions prepared from them and to methods of producing the same.

It is one of the objects of the invention to provide novel and useful compounds of this kind which possess advantages over other known compounds for various purposes.

A further object is the provision of processes for producing these new compounds and also for using them to produce useful industrial compositions.

The invention provides novel dithiols having formal and thioether groups and, in particular, it provides such compounds which have the general formula

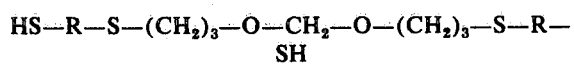

in which R is a divalent radical of from one to 10 carbon atoms. It can be a substituted or unsubstituted, linear or branched aliphatic group, a cycloalkyl group or an aromatic group. R can also include thioether groups.

The invention is also concerned with processes for the preparation of these new compounds and with their use for the preparation of compositions of industrial value.

The dithiols of the invention provide extremely useful industrial products. The simultaneous presence of the thiol functions, thioether groups and formal makes these compounds very reactive and they are capable of being used in a large number of fields. Thus they, as well as the linear or cyclic polysulphides which can be obtained by their oxidation, constitute a desirable material for the plasticizing of sulphur.

The various compositions which are obtained by the reaction of the molten sulphur with either such polysulphides or with the dithiols with formal and thioether groups can be used for a large number of purposes. The relative proportions of each constituent can vary within wide limits. Thus the sulphur can have the plasticizer added to it in a very wide range of proportions; for example from 1 to 99 percent, of plasticizer may be used.

Depending on the composition, these plastic compositions can be used for different purposes. They can form excellent coatings, particularly for concrete, brickwork, asphalted surfaces or other similar materials; one particularly practical use is the provision of road-marking strips. These plastic compositions can also be used as floor coverings by direct casting, possibly with an admixture of sand and/or gravel, with which they form a cement. These products can also be used as sealing joints, as a mastic, or as a material for use in the building industry.

It is evident that the sulphur compositions which are obtained can be modified in ways known at the present time which have for their purpose to impart to other materials such properties as a better adhesive power and non-inflammability. It is also possible to incorporate into the plasticized sulphur (particularly for use in the provision of road-marking strips), of balls of a plastics material, rubber or glass, and/or suitable coloring agents or dyes.

The dithiols of the invention can also be used as synthesis intermediaries for the manufacture of products having a biological action. They are oil modifiers. They can be used in those cases where mercaptans are normally employed.

The process according to the invention consists in causing the reaction with diallyl formal of a dithiol of the formula HS— R—SH, R having the same meaning as given above, possibly with the inclusion of one or more thioether groups.

The dithiols which are used can be selected from a wide range of products conforming to the said general formula. However, the preferred dithiols are those in which the R group has one to two carbon atoms, as well as those comprising thioether groups, that is to say, those of the formula $HS(CH_2S)_nH$, in which $n$ can be 1, 2, or 3.

One preferred form of the invention consists in causing allyl alcohol to react with trioxymethylene, and then fixing a dithiol on the diallyl formal which is obtained.

The preferred working procedure consists in dissolving the mixture of allyl alcohol and trioxymethylene in a solvent, such as benzene, and in adding a small quantity of concentrated hydrochloric acid in the form of a previously prepared solution in benzene; after this introduction, the mixture is maintained under reflux and while stirring until the reaction has ended. The two layers are separated and the pure diene is obtained by distilling off the solvent of the organic phase.

The diallyl formal is then mixed with dithiol. The reaction is continued while stirring until the reaction is completed. After distilling off the products which have not reacted, the desired product is obtained, which is a dithiol with formal and thioether groups.

The invention is illustrated by the following non-limiting examples:

EXAMPLE 1

1508g of allyl alcohol (26 moles), 390g of trioxymethylene (13 moles), 1000 cc of benzene and 0.3 mole of hydrochloric acid in solution in benzene are mixed in a 4-liter reactor, which is equipped with a thermometer, a stirrer mechanism and a reflux condenser. Stirring under reflux takes place for 12 hours, the water of the reaction being separated as it is formed. The organic phase is washed several times with water until neutral. 1492 g of pure diallyl formal are distilled. 384 g (3 moles) of diallyl formal are mixed with 960 g (12 moles) of dithiol methane in a 1-liter reactor while stirring. The stirring is maintained for 3 days at −40°C. The dithiol methane excess and the diallyl formal which has not reacted are distilled. There are obtained 660 g of a mercaptanic liquid which is formed, for the major part, of a new product, which is: 1,13-dimercapto-2,12-dithia-6,8-dioxatridecane:

Analysis of this product indicates the following characteristics:

|  | Found | Calculated |
| --- | --- | --- |
| SH % | 22.5 | 22.9 |
| Molecular weight | 295 | 288 |

The crude mercaptanic liquid, which corresponds to a mixture of dimercaptodithioether diallyl formal and more complex dithiols, as well as the linear or cyclic polysulphides obtained from these compounds, react with sulphur at 150°C to give a plasticized, modified sulphur, having a vitreous transition temperature of −55°C.

EXAMPLE 2

The operation is carried out, as in Example 1, for the preparation of diallyl formal. Thereafter, using a 1-liter reactor, mixing is carried out, while stirring, of 128 g (1 mole) of diallyl formal with 378 g (3 moles) of bis-(mercaptomethyl) sulphide $HSCH_2S\ CH_2SH$. The stirring is maintained for 3 days at 40°C. The dithiol excess and the diallyl formal which has not reacted are distilled and there are obtained 376 g of a mercaptanic liquid, which is formed for the major part of a new compound, which is the following dimercaptan:

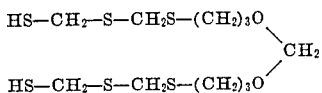

namely: 1,17-dimercapto-2,4,14,16-tetrathia-8,10-dioxa-heptadecane.

Analysis of this dimercaptan indicates the following characteristics:

|  | Found | Calculated |
|---|---|---|
| SH % | 17.3 | 17.4 |
| Molecular weight | 400 | 380 |

The crude mercaptanic liquid, which corresponds to a mixture of the previous dithiol and of more complex dithiols, as well as the linear or cyclic polysulphides obtained from these compounds, react with sulphur at 150°C to give a plasticized, modified sulphur, having a vitreous transition temperature of −39°C.

We claim:

1. A dithiol having formal and thioether groups, of the general formula:

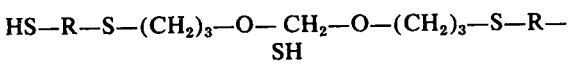

in which R is a $CH_2$ group.

2. A dithiol according to claim 1, characterized in that it is 1,13-dimercapto-2,12-dithia-6,8-dioxatridecane.

3. A dithiol according to claim 1, characterized in that it is 1,17-dimercapto-2,4,14,16-tetrathia-8,10-dioxaheptadecane.

* * * * *